United States Patent
Namekawa

(10) Patent No.: US 6,237,027 B1
(45) Date of Patent: *May 22, 2001

(54) ELECTRONIC MAIL SYSTEM, COMPUTER DEVICE, AND REMOTE NOTIFICATION METHOD

(75) Inventor: Nobuo Namekawa, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,146

(22) Filed: Jun. 10, 1997

(30) Foreign Application Priority Data

Jun. 20, 1996 (JP) .................................................. 8-180022

(51) Int. Cl.⁷ .............................. G06F 15/16; G06F 15/76
(52) U.S. Cl. ......................... 709/206; 709/206; 709/225; 709/244; 455/403; 455/412
(58) Field of Search .................................... 709/206, 225, 709/229, 244; 455/403, 412, 413

(56) References Cited

U.S. PATENT DOCUMENTS 5,479,408 * 12/1995 Will .
5,778,187 * 7/1998 Monteiro et al. .
5,822,692 * 10/1998 Krishan et al. .
6,014,559 * 1/2000 Amin .

* cited by examiner

Primary Examiner—Robert B. Harrell
Assistant Examiner—Stephan Willett
(74) Attorney, Agent, or Firm—Jay H. Maioli

(57) ABSTRACT

In an electronic mail system, including a computer device and an arrival notification method, a user can confirm an arrival of electronic mail regardless of where he is and a drop in operating time of a portable information terminal device can be prevented. The computer device has a first communication unit for receiving and transmitting the electronic mail from/to other computer devices and detecting the arrival of electronic mail, a second communication unit for communicating with the portable information terminal device through a predetermined communication circuit, a memory wherein identification information of the portable information terminal device is stored, and a communication controller for informing the arrival of electronic mail to the portable information terminal device based on the identification information when the arrival of electronic mail is detected. Since the arrival of electronic mail is informed to the portable information terminal device side from the computer device side, the arrival of electronic mail can be informed to the user who is away from the computer device side, thus making the access from the portable information terminal device side unnecessary so that, wasteful consumption of battery power can be avoided.

14 Claims, 9 Drawing Sheets

ELECTRONIC MAIL SYSTEM, COMPUTER DEVICE, AND REMOTE NOTIFICATION METHOD

BACKGOUND OF THE INVENTION

This invention relates to an electronic mail system, a computer device, and an arrival notification method, and more particularly is, suitably applied to the case of receiving and transmitting electronic mail between computer devices connected to a network.

DESCRIPTION OF THE RELATED ART

In recent years, an increasing use of a computer network system such as a local area network (LAN) and a wide area network (WAN) has become remarkable. The computer network system is formed by connecting between computers by using communication circuits such as telephone lines so that data possessed by each computer can be used in common and information can be exchanged between users of the computers.

In general, the LAN is a network to be used within a comparatively small area such as within a building or company, and a typical connecting configuration of the LAN is a bus-type network. The bus-type network is constituted by connecting computers respectively to the common bus formed of such as a coaxial cable, optical fiber cable, or twist pair line provided in a building. In this connection, Ethernet is especially famous as the communication system formed on the LAN.

Further, the WAN is a computer network system to be used within a wide area such as within a country. The system is constituted by centering around host computers for example and a user of each computer can use various services offered by the host computers by connecting to a host computer with public lines such as telephone lines. Since the WAN is a network system formed covering a wide area, plural host computers may be placed in every fixed area as access points. These host computers are connected with each other by communication circuits. Therefore, a user connects the user's computer to a desired host computer device by a circuit, so that data controlled by the other host computers arranged in various places can be utilized without being conscious that each host computer is spreading out.

In this connection, as a famous computer network system, there is Internet which is connected to LANs and host computers arranged in various places in the world. In the Internet, users can easily access to computer devices of the foreign country, thus data can be utilized on a worldwide scale.

As one of the service facilities which is used in the computer network system, there is a facility called electronic mail. The electronic mail will be described below referring to the case of LAN.

Firstly, a predetermined area (hereinafter, referred to as electronic P.O. Box) is reserved in a storage area of each computer. Each computer writes literal information representing a desired message (hereinafter, referred to as electronic mail) in the electronic P.O. Box of the other computer through a common bus. Then, the user of each computer read out the written mail. Thus, the user of each computer can exchange information with the user of the other computer in the same sense as that of exchanging letters by mail. According to the electronic mail facility, a sender can send the mail to a desired computer (i.e., user) by assigning an ID number which is an address on the network, in addition, a receiver side can access the electronic P.O. Box of his computer at his convenience so as to receive the mail.

In order to utilize the electronic mail facility, it is necessary to always connect the computer to the network by the common bus like the LAN or the wire circuit such as the telephone line like the WAN in general. This is because if the other user wants to send mail, he can transmit it only to the other computers which are always connected to the network.

However, in the case where the computer is set fixedly, it causes a problem that the user is not able to know an arrival of mail when he is away from the setting point of the computer, for example, when he is on a vacation or a business trip.

In order to prevent such problems, a method is considered in which mail is received by computers which are always connected to the network as before and the arrival of mail is confirmed by accessing to the computer using a portable information terminal device having communication facilities.

However, in the case of this method, the user does not know whether or not the mail for him has arrived till he accesses to the computer side. Accordingly, the user repeats the access over and over again in order to confirm the arrival of mail, and this causes a problem that the battery power would be wasted by the useless accesses. In general, since the portable information terminal device is driven by a battery and its operating time is limited by the capacity of battery, the operating time would be tremendously shortened due to the repeated accesses.

More specifically, in the case of the computer network system according to the computers connected by the wire circuits, it is not necessary to consider the power consumption and the arrival of mail can be confirmed always, however, on the other hand, the user cannot move away from the computer.

Further, in the case of accessing to the computer by using the portable information terminal device in order to confirm the arrival of mail, the arrival of mail can be confirmed at any place. However, the user must access to the computer for confirmation, so that the battery power would be wasted if the mail has not arrived, it causes a significant drop in operating time of the portable information terminal device.

SUMMARY OF THE INVENTION

In view of the foregoing, an object of this invention is to provide an electronic mail system, a computer device, and an arrival notification method in which an arrival of electronic mail can be confirmed regardless of where a user is and a drop in operating time of the portable information terminal device due to the wasteful repetition of accesses can be prevented.

The foregoing object and other objects of the invention have been achieved by the provision of a computer device which receives electronic mail services by connecting to a computer network to provide the electronic mail services, the computer device comprises a first communication means for receiving and transmitting the electronic mail from/to other computer devices connected to the computer network and detecting the arrival of electronic mail, a second communication means, which is connected to a radio communication net through a predetermined communication circuit, for communicating with a portable information terminal device through the radio communication net, a storage means for storing identification information of the portable information terminal device, and a communication control means for informing the arrival of electronic mail to the portable information terminal device through the predetermined communication circuit and the radio communication net established by the second communication means on the basis of the identification information when the arrival of electronic mail is detected.

Since the computer device detects the arrival of electronic mail and informs the arrival to the portable information terminal device, the user who is away from the computer can be informed with the arrival of electronic mail and the access from the portable information terminal device side to the computer device side becomes unnecessary. Thus, wasteful consumption of battery power of the portable information terminal device can be avoided.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
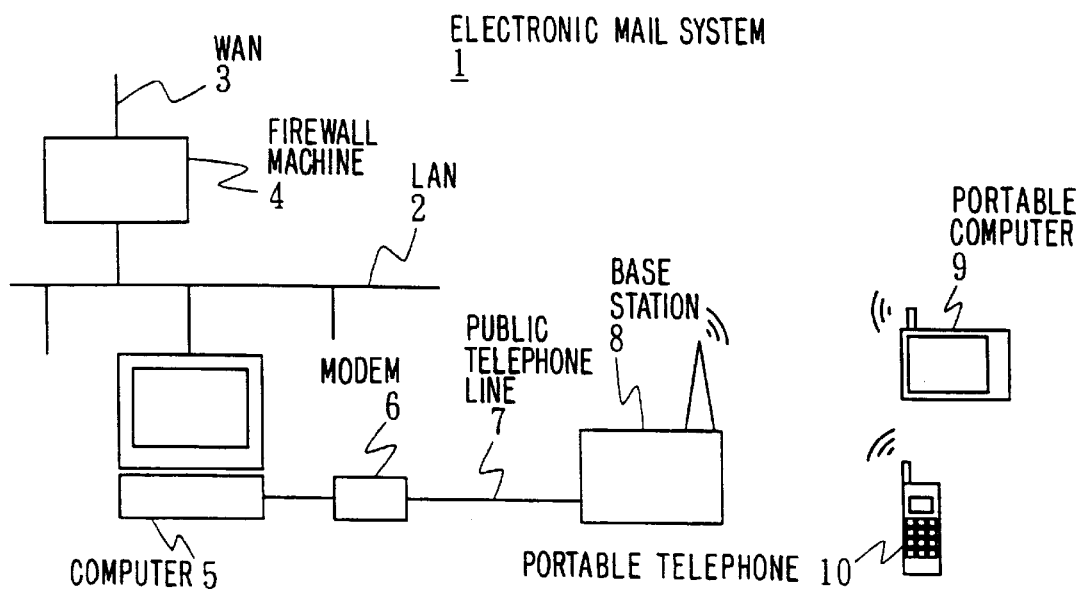
FIG. 1 is a schematic diagram showing the general construction of a computer network system according to the embodiment.

In FIG. 1, numeral 1 generally shows an electronic mail system according to a computer network, and a local area network (LAN) 2 constructed in an office is connected to a wide area network (WAN) 3. In the electronic mail system 1, each of the computer devices connected to the LAN 2 and the WAN 3 can receive/transmit message information being literal data (hereinafter, referred to as electronic mail) with each other. Thus, in the electronic mail system 1, the electronic mail is used for exchanging messages between users of computer devices.

The LAN 2 is connected through a firewall machine 4 to the WAN 3 which is an outer computer network. The firewall machine 4 conducts security control to the accesses from the outside through the WAN 3. More specifically, the firewall machine 4 permits each computer 5 connected to the LAN 2 to freely access to the WAN 3, and it confirms the existence of permission to the user who is attempting to access to the LAN 2 through the WAN 3 in order to refuse the access for the user having no permission. With this arrangement, it prevents from the user without permission utilizing each data recorded in each computer 5 in the LAN 2 and giving a risk to the data.

Further, each computer 5 connected to the LAN 2 is connected to a modem 6 as a communication means. The modem 6 is connected to a public telephone line 7 so as to be connected to a base station 8 through the public telephone line 7. Moreover, the base station 8 is connected to portable information terminal devices such as a portable computer 9 and a portable telephone 10 through a radio circuit. In addition, the portable computer 9 and the portable telephone 10 can connect to the computer 5 in the same manner. Each computer 5 can mutually communicate with the portable computer 9 and the portable telephone 10 by using thus established communication circuits. Note that, the portable computer 9 receives/transmits literal information from/to the computer 5 through the communication circuits, while the portable telephone 10 transmits/receives speech information and a little literal information through the communication circuits.

Figure 2:
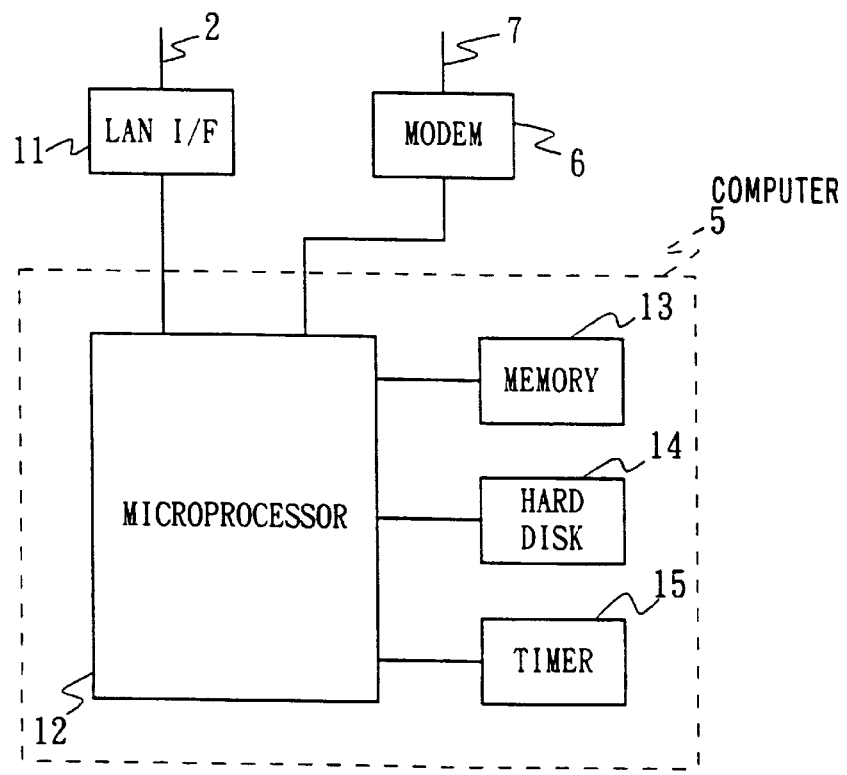
FIG. 2 is a block diagram showing the construction of a computer device according to the first embodiment.

FIG. 2, in which corresponding parts of FIG. 1 are given the same reference numerals, shows an internal construction of the computer 5. The computer 5 is connected to the LAN 2 via a LAN interface 11 and can transmit/receive electronic mail to/from other computers (not shown) through the LAN 2 and/or the WAN 3 (FIG. 1) as described above. The computer 5 can also connect to the base station 8 (FIG. 1) through the public telephone line 7 by the modem 6, thereby can communicate with the portable computer 9 and the potable telephone 10 (FIG. 1) through thus established communication circuits.

The computer 5 receives the electronic mail transmitted through the LAN 2 and the LAN interface 11 and then writes it on a hard disk 14, by the control of a microprocessor 12. The microprocessor 12 comprises a detecting means for detecting the existence of electric mail arrived at the computer 5 and a communication control means for controlling a communication processing according to a predetermined communication processing procedure. The microprocessor 12 controls inner parts of the computer 5 and conducts a data processing of inputted electronic mail by using a memory 13. The hard disk drive 14 is a recording means, which is connected to the microprocessor 12, and memorizes and stores arrived electronic mail. Also, in the hard disk drive 14, the predetermined communication processing procedure, setup information, and literal data being messages to inform the arrival have been memorized in advance. In this connection, the predetermined communication processing procedure is an electronic mail program.

Further, the microprocessor 12 is connected to a timer 15 and time information is constantly given. The computer 5 counts a predetermined time and displays time by using the given time information.

The computer 5 controls transmitting and receiving of the electronic mail with the other computer 5 and the arrival notification of electronic mail to the portable computer 9 or the portable telephone 10 according to the communication processing procedure and the setup information recorded on the hard disk drive 14. More specifically, as described above, the computer 5 detects the arrival of electronic mail which is transmitted from the another computer, not shown, through the LAN 2 and the arrival of electronic mail which is transmitted from the outside of the LAN 2 through the WAN 3, by the microprocessor 12 at regular intervals based on the time information given from the timer 15. Moreover, when the computer 5 detects the arrival of electronic mail, the computer 5 calls out the portable computer 9 or the portable telephone 11 sequentially through the modem 6, the public telephone line 7, and the base station 8 and then transmits message data for informing the arrival, which has been recorded beforehand on the hard disk drive 14, in order to inform the arrival of electronic mail to the user via the portable computer 9 or the portable telephone 10.

In this case, if the linking portable information terminal device is the portable computer 9, the computer 5 informs the arrival with the literal information. Further, if the linking portable information terminal device is the portable telephone 10, the computer 5 converts the aforementioned literal information into the speech information by using the microprocessor 12 to inform the arrival of electronic mail by the obtained speech information. The literal information and the speech information to be transmitted are respectively the literal information and the speech information representing that the electric mail has arrived.

The computer 5 selectively switches facilities on the arrival notification on the basis of the setup information registered by the user beforehand, according to the communication processing procedure recorded on the hard disk drive 14. Here, the setup information can be roughly classified into identification information on the portable information terminal device of the other party to which the arrival is informed, and parameter information for selecting the facilities when conducting the communication processing procedure, and the information have been registered by the selection and setting of the user in advance.

More specifically, the identification information includes the setting of specifying the sender of electronic mail who conducts the arrival notification, the setting of the subscriber's number, and the classification of the portable information terminal device to which the arrival is informed. On the other hand, as the parameter information, the time interval to detect arrivals of electronic mail, the number of redialings, the type of data to be transmitted for informing, and modes of communication processing procedure are provided.

The computer 5 controls the transmitting/receiving processing of the electronic mail according to the communication processing procedure. In the case of requiring the selection of facilities and the setting of parameter, the computer 5 refers to the setup information. The setup items will be described later in detail.

Firstly, in the item to specify the sender, it is set that the arrival of electronic mail is informed to the portable computer 9 or the portable telephone 10 when the electronic mail is sent from which computer 5 (i.e., user). In the case where the sender is specified in this item, the arrival of electronic mail sent from the computer other than the specified computer 5 is not informed. Further, in the case where the sender is not specified, the arrival of all electronic mails is informed. Furthermore, in the case where the specification of the sender is invalid, the arrival of all electronic mails is not informed.

In addition, in the item to set the subscriber's number, the number of subscribers of the portable computer 9 or the portable telephone 10 to which the arrival is informed, that is, the telephone number to start a call is set.

Further, in the item to set the type of portable information terminal devices, the portable information terminal device to which the arrival is informed is either the portable computer 9 or the portable telephone 10 is set. In the case where the portable information terminal device to which the arrival is informed is the portable computer 9, the computer 5 transmits the message data such as "An electronic mail has arrived" adding the name of the sender of the electronic mail and the address number of the sender because the portable computer 9 can display letters. These message data has been formed by the user and recorded on the hard disk drive 14 in advance and registered in the setup information as the message data to be read out in case of informing the arrival. Further, since the name of the sender of the electronic mail and the sender's address (hereinafter, referred to as ID number) exist on a predetermined position because of the format of electronic mail, these are detected to be added to the message data. On the other hand, in the case where the portable information terminal device to which the arrival is informed is the portable telephone 10, since the portable telephone 10 is able to output only the speech data, the computer 5 converts the literal message for arrival notification into the speech data to transmit it.

Further, regarding this item, the item to set whether the data to be transmitted in case of informing the arrival is only the literal message for informing the arrival as described above or transmitted by adding the main body of arrived electronic mail is provided. At this point, according to the registered setting, the computer 5 transmits only the message data for informing the arrival or transmits by adding the main body of arrived electronic mail to this message data when the electronic mail is arrived. In the case where the portable information terminal device to which the arrival is informed is the portable telephone 10, only message transmission can be selected in this item.

Further, in the item to set the time interval of arrival detection, it is set at what time intervals the arrival of electronic mail is detected. Also in the item to set the number of redialings, it is set up to how many times the call is issued to the portable computer 9 or the portable telephone 10. And if the number of calls exceeds the number of calls set here, the computer 5 records the failure of connecting on the electronic mail of which the arrival was informed and the time tried to connect. The user can judge based on the record whether he is not within the receivable area of the base station 8 or any trouble occurs in the computer 5. On the other hand, when the connection has succeeded, the computer 5 records that the connection has succeeded on the electronic mail of which the arrival was informed on the hard disk drive 14 as the communication record.

Furthermore, in the item to set modes of the communication processing procedure, a normal mode to execute the communication processing procedure according to the user's operation and a message mode to inform the arrival of electronic mail to the portable computer 9 or the portable telephone 10 during the user's absence are switched and set.

More specifically, in the case of the normal mode, the communication processing procedure is executed under the user's instruction. In this case, the computer 5 executes the communication processing procedure according to a command which is instructed and inputted selectively by the user regardless of the aforementioned setup items. On the other hand, in the case of the message mode, the computer 5 informs the arrival of electronic mail to the portable computer 9 or the portable telephone 10 on the basis of the aforementioned setup information judging that the user is out.

Figure 3:
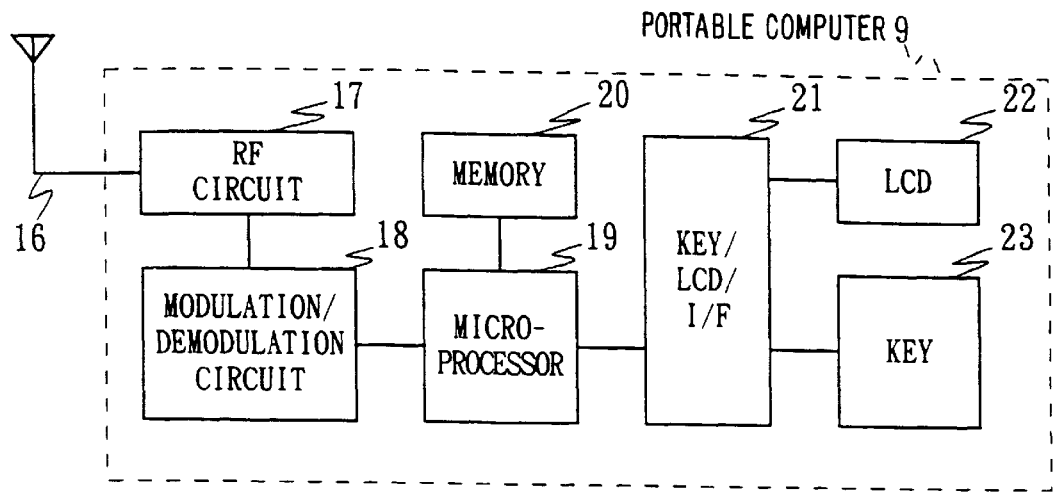
FIG. 3 is a block diagram showing the construction of a portable computer.

In FIG. 3, numeral 9 generally shows a portable computer, which receives a transmission signal being literal data transmitted from the computer 5 (FIG. 1) to display the literal data which is represented by the transmission signal.

More specifically, the transmission signal being literal data transmitted from the computer 5 is transmitted to the base station 8 through the modem 6 and the public telephone line 7 (FIG. 1). The base station 8 modulates the transmitted transmission signal with a fixed modulation scheme and transmits the obtained radio wave. The portable computer 9 receives the transmitted radio waves by an antenna 16. The portable computer 9, first of all, demodulate the received radio wave to the original signal form via a radio frequency (RF) circuit 17 and a modulation/demodulation circuit 18 to supply the obtained signal to a microprocessor 19. The microprocessor 19 data-processes the supplied signal by using a memory 20 to output to an LCD 22 via a key/LCD interface 21. In this way, the literal data transmitted from the computer 5 is displayed on the screen of the LCD 22.

Moreover, in the case of transmitting data from the portable computer 9, literal data inputted by operating the key 23 by the user with confirming on the LCD 2 is supplied to the microprocessor 19 through the key/LCD interface 21. The microprocessor 19 performs a predetermined data processing on the literal data by using the memory 20 to output the obtained data signal to the modulation/demodulation circuit 18. The modulation/demodulation circuit 18 and the RF circuit 17 modulate the supplied data signal in accordance with the predetermined modulation scheme and transmit a from the antenna 16.

Figure 4:
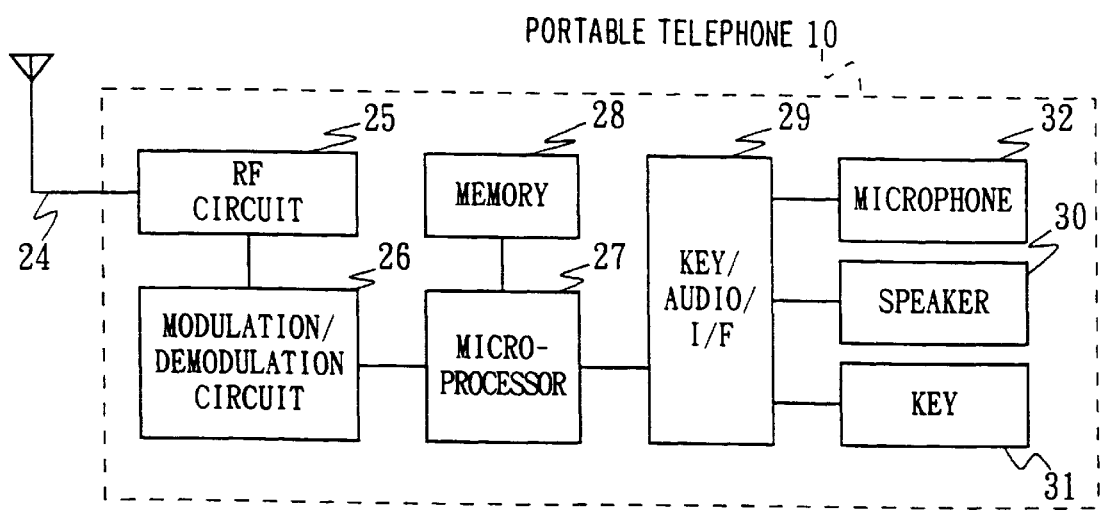
FIG. 4 is a block diagram showing the construction of a portable telephone.

Moreover, as shown in FIG. 4, numeral 10 generally shows a portable telephone 10, which receives the transmission signal being speech data transmitted from the computer 5 (FIG. 1) and outputs the speech data represented by the transmission signal as a speech signal.

More specifically, the transmission signal being speech data transmitted from the computer 5 is transmitted to the base station 8 through the modem 6 and the public telephone line 7 (FIG. 1). The base station 8 modulates the transmitted transmission signal in accordance with the predetermined modulation scheme to transmit the obtained radio wave. The portable telephone 10 receives the transmitted radio wave by an antenna 24. The portable telephone 10, first of all, demodulates the received radio wave to the original signal form via an RF circuit 25 and a modulation/demodulation circuit 26 to supply the obtained signal to a microprocessor 27. The microprocessor 27 data-processes the supplied signal by using a memory 28 to output from a speaker 30 via a key/audio interface 29.

Further, in the case of transmitting speech data from the portable telephone 10, the terminal of the responded other party and the communication circuit are connected when the user enters a telephone number by operating a key 31. Under this condition, the voice which is inputted from a microphone 32 is supplied to the microprocessor 27 as a speech signal through the key/audio interface 29. The microprocessor 27 performs the predetermined data processing on the speech signal by using the memory 28 to output the obtained data signal to the modulation/demodulation circuit 26. The modulation/demodulation circuit 26 and the RF circuit 25 modulate the supplied data signal in accordance with the predetermined modulation scheme and transmit it from the antenna 24.

According to the aforementioned construction, the computer 5 informs the arrival of electronic mail to the portable computer 9 and the portable telephone 10 according to the communication processing procedure which is described below. Since the communication processing procedure of the portable information terminal device is slightly different in the portable computer 9 and the portable telephone 10, the processing procedure for these devices will be described separately.

Figure 5:
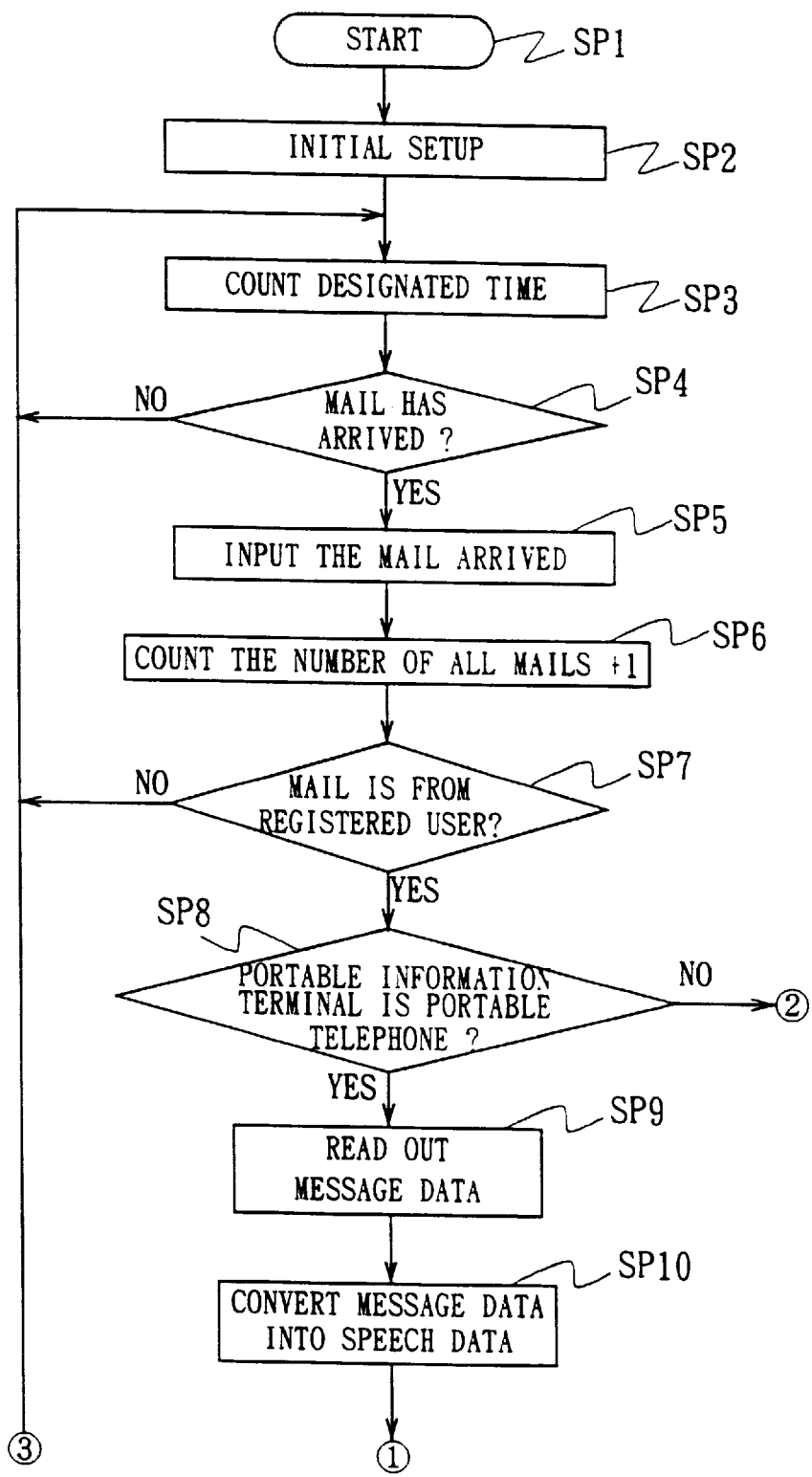
FIGS. 5 and 6 are flowcharts explaining the communication processing procedure of the computer device side according to the embodiment.
Figure 6:
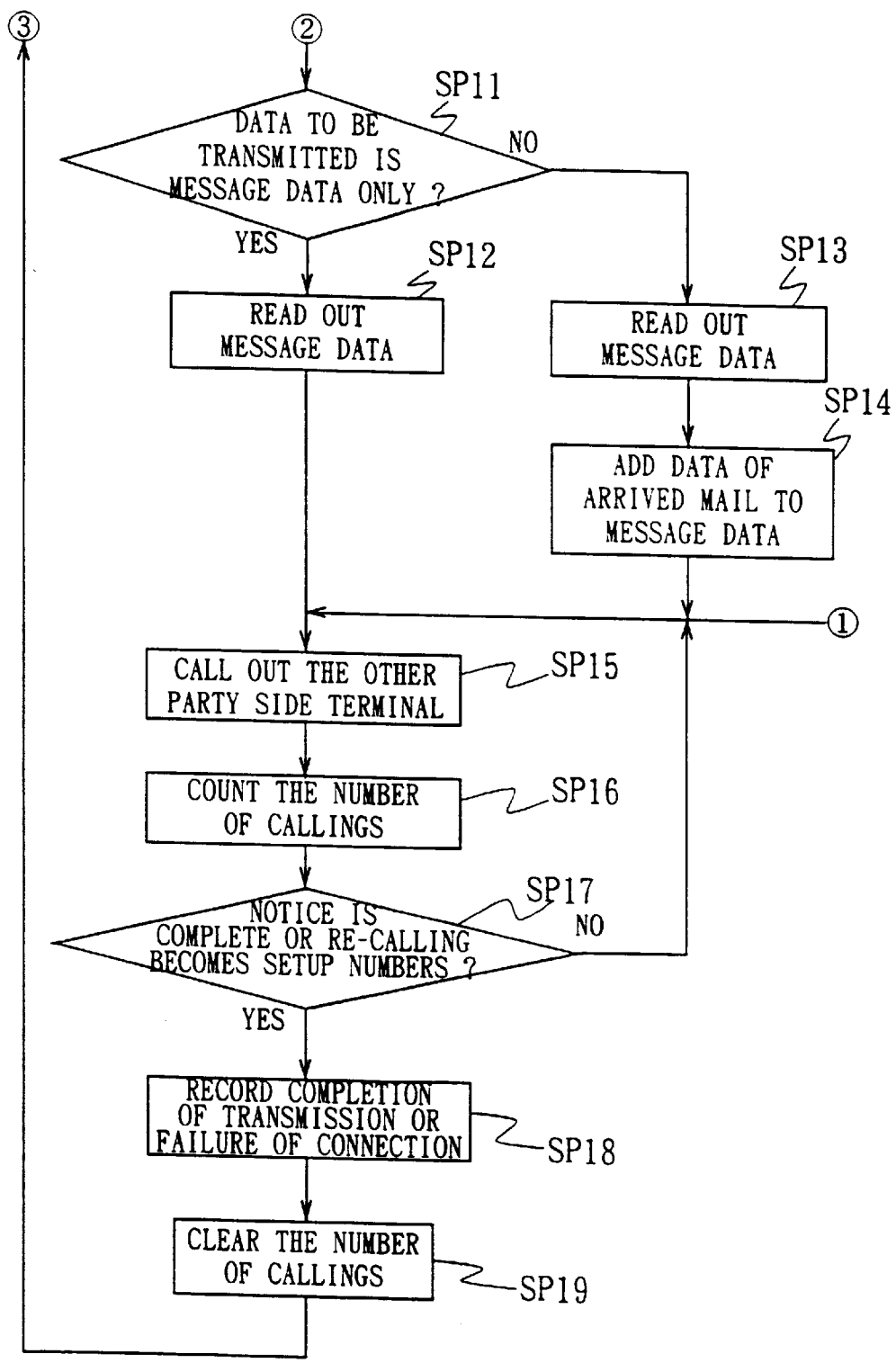

As shown in FIGS. 5 and 6, firstly, the computer 5 (FIG. 1) side starts the communication processing procedure at step SP1. At step SP2, the computer 5 reads out the setup information which has been registered and memorized on the hard disk drive 14 (FIG. 2) beforehand and performs an initial setup on the basis of the read setup information.

Then, at step SP3, the computer 5 starts counting the designated time registered in the read setup information on the basis of the time information to be supplied by the timer 15 (FIG. 2). Every time thus counting the fixed time, the computer 5 detects at step SP4 whether or not the electronic mail has arrived within the counted fixed time interval. More specifically, the computer 5 sets up a flag to show the arrival of electronic mail when the electronic mail has arrived, by judging whether or not the flag is set up or not in the case of detecting the arrival, it is detected whether or not the electronic mail has arrived. Note that, the flag will be cleared every time when the arrival is detected. In the case where the arrival of electronic mail has not been detected, the computer 5 returns to step SP3 and detects again for the designated time, and when the arrival of electronic mail is detected, proceeds to the following step.

When the computer 5 detects the arrival of electronic mail, at step SP5, it records the arrived electronic mail on the hard disk drive 14 and adds up the total number of electronic mail arrived at the step SP6. The computer 5 renews the total number on the hard disk drive 14 as a communication record. In this case, the arrival time and the sender's ID number of each electronic mail are recorded.

Then, at step SP7, the computer 5 identifies whether or not the arrived electronic mail is from the specific sender. Specifically, comparing the specific sender's ID number registered in aforementioned setup information with the ID number written in the arrived electronic mail, if these ID numbers agree each other, it is identified that the electronic mail is from the specific sender. As described above, since the sender's ID number is written on the predetermined position according to the electronic mail format, the ID number can be detected easily from the letter of the electronic mail. As a result of identification, if the computer 5 identifies that the arrived electronic mail is not from the specific sender, it returns to step SP3 and detects again the designated time. Moreover, as a result of identification, if the computer 5 judges the arrived electronic mail is from the specific sender, it proceeds to the following step and starts preparation for the arrival notification.

At step SP8, the computer 5 identifies whether or not the portable information terminal device to which the arrival is informed is the portable telephone 10 (FIG. 1). Specifically, since the type of portable information terminal devices has been set and registered in the aforementioned setup information beforehand, the computer 5 reads the setup information to identify whether or not it is the portable telephone 10. In the case where the portable information terminal device to which the arrival is informed is identified as the portable telephone 10 based on these identifications, the computer 5 proceeds to step SP9.

At step SP9, the computer 5 reads out the message data for informing the arrival. The message data has been produced by the user in advance and recorded on the hard disk drive 14. The computer 5 adds the name and ID number of the sender of electronic mail of which the arrival is informed to the read message data. Thus, the sender of the electronic mail can be identified. Then, at step SP10, the computer 5 converts the read message data from the literal data into the speech data. More specifically, since the message data which is prepared at steps SP9 and SP10 are data for being transmitted to the portable telephone 10, the message data are converted into the speech data in the form capable of being outputted at the portable telephone 10. Moreover, in this case, in order to warn the user regarding the arrival of a message and to inform the arrival of electronic mail to the portable telephone 10, the speech data of a warning sound is added to the head of the data to be transmitted. The warning sound has been set in advance so that the sound differs from the calling sound which is used in the portable telephone 10. Then, when the preparation of message data is completed, the process proceeds to the following step.

On the other hand, if the computer 5 identifies by the identification of step SP8 that the portable information terminal device of the other party to which the arrival is informed is not the portable telephone 10, that is, the portable computer 9 (FIG. 1), the process proceeds to step SP11.

At step SP11, the computer 5 judges whether or not the data to be transmitted is message data only. At this point, since types of the data to be transmitted are registered in the aforementioned setup information, the computer 5 reads out the setup information to determine the type of data to be transmitted. In the case where the data to be transmitted is message data only, the computer 5 reads out the message data from the hard disk drive 14 at step SP12 to add the sender's name and the sender's ID number of the electronic mail of which the arrival is informed, and completes the preparation for data to be transmitted.

Further, in the case where the data to be transmitted is not message data only, at step SP13, the computer 5 reads out the message data from the hard disk drive 14 to add the name and ID number of the sender of the electronic mail. Then, at step SP14, the computer 5 adds the main body of the arrived electronic mail to the message data and completes the preparation of data to be transmitted.

Accordingly, when the preparation of data to be transmitted is completed at steps SP10, SP12 or SP14, the process proceeds to step SP15.

At step SP15, the computer 5 calls up the portable information terminal device of the other party side. More precisely, the modem 6 (FIG. 2) makes the call by the subscriber's number (i.e., telephone number) registered in the aforementioned setup information. At step SP16, the computer 5 counts whenever calls are issued as the number of callings. Thus, the communication circuit is established with the portable information terminal device of the other party side according to the issued calls, the computer 5 transmits the prepared transmission data (not shown).

At step SP17, the computer 5 detects whether the data transmission is terminated by a response of the portable information terminal device of the other party side or not, or the number of callings exceeds the setup number or not. Here, the number of callings has been registered in aforementioned setup information in advance. In the case where the portable information terminal device of the other party side does not answer the call and the number of callings is less than the setup number, the computer 5 returns to step SP15 to issue the call again. Further, in the case where the portable information terminal device of the other party side answers the call and the data transmission is complete, or the number of callings is the setup number or more, at step SP18, the computer 5 records the completion of communication or failure of communication on the communication record. In this case, the ID number of the sender of electronic mail and the communication time are recorded on the communication record.

Further, in the case where the arrival of electronic mail could not be informed to the portable information terminal device side due to a failure of the communication, the computer 5 sets up a flag to show the arrival of electronic mail (not shown) as described in step SP4. Thus, the computer 5 can proceed to the preparation for the arrival notification thereafter even in the case where no new electric mail arrives, and can try to connect to the electronic mail repeatedly at regular intervals until the arrival notification on the electronic mail of which the arrival notification was failed is successful. Moreover, in the case where the communication fails, the prepared transmission data is left as it is, and transmitted as it is to the portable information terminal device when the following connection trial succeeds. Moreover, during that period if the electronic mail of which the arrival is informed newly arrives, the computer 5, after preparing the data to be transmitted according to the same data processing as those of (SP7 to SP14), accumulates data adding to the transmitting data previously left as it is.

When the computer 5 completes these communication recording and flag processing, it clears the counting of the number of callings (SP16) at the step SP19 and returns to step SP3.

Figure 7:
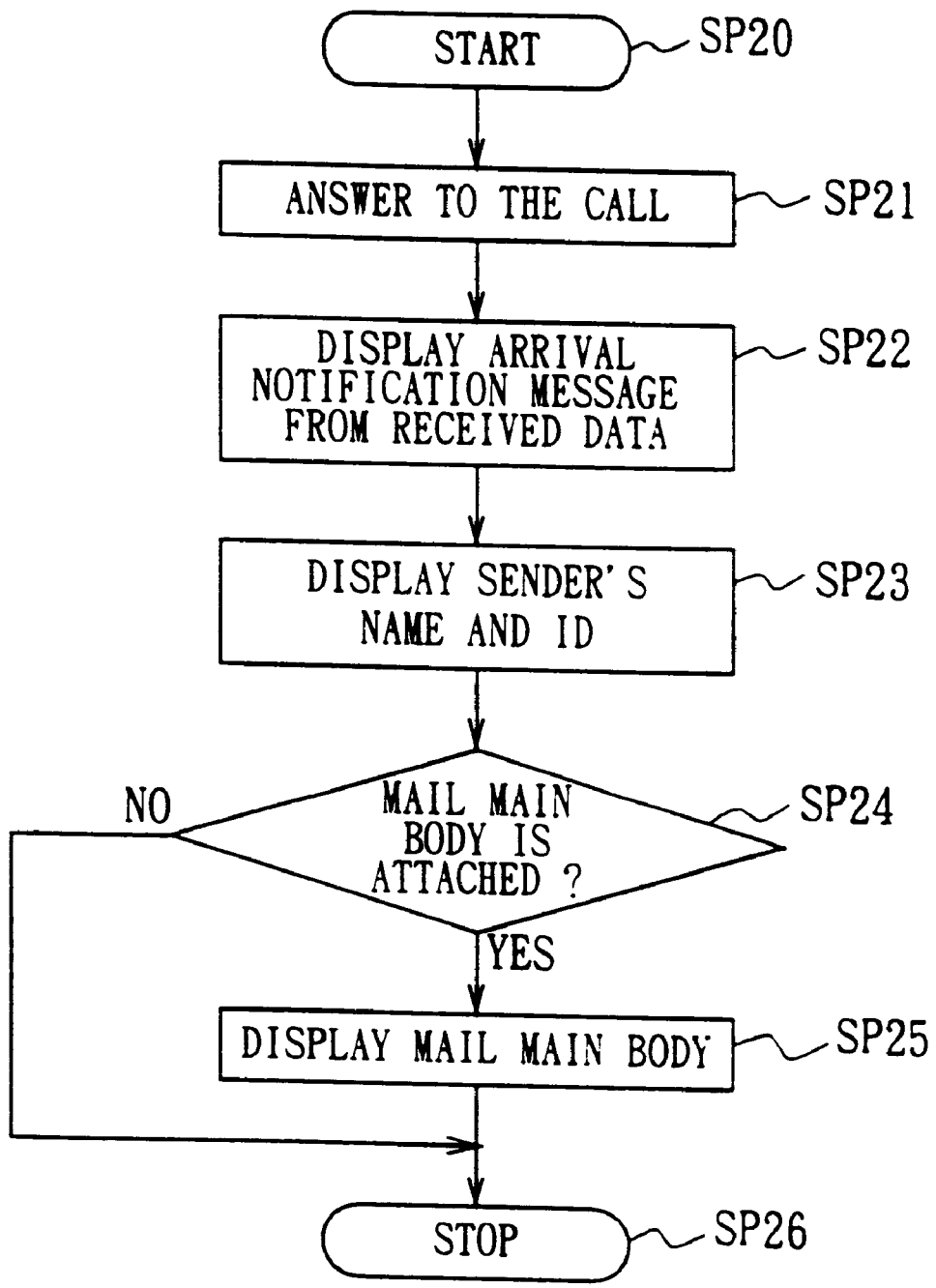
FIG. 7 is a flowchart explaining the communication processing procedure in the case where the portable information terminal device is the portable computer.

Next, the communication processing procedure in the case where the portable information terminal device is the portable computer 9 will be described. As shown in FIG. 7, the portable computer 9 starts the processing at step SP20. At step SP21, the portable computer 9 answers the call made from the other party side. Thus, the communication circuit is established between the portable computer 9 and the other party side. The portable computer 9 waits with a waiting state till the call is issued from the other party side.

Then, at step SP22, the portable computer 9 receives data which is transmitted from the computer 5 of the other party side and displays the data on the LCD 22. In this time, the portable computer 9 firstly displays the message data to inform the arrival of electronic mail. That is, the literal message such as "An electronic mail has arrived" is displayed on the LCD 22.

Then, at step SP23, the portable computer 9 displays the name and ID number of the sender of electronic mail added to the message data. Then, at step SP24, the portable computer 9 judges whether or not the main body of electronic mail is added to the message data. In the case where it is added, the portable computer 9 continuously displays the main body of electronic mail at step SP25 and terminates the procedure at step SP26. On the other hand, in the case where it is not added, the portable computer 9 terminates the procedure as it is (step SP26).

Figure 8:
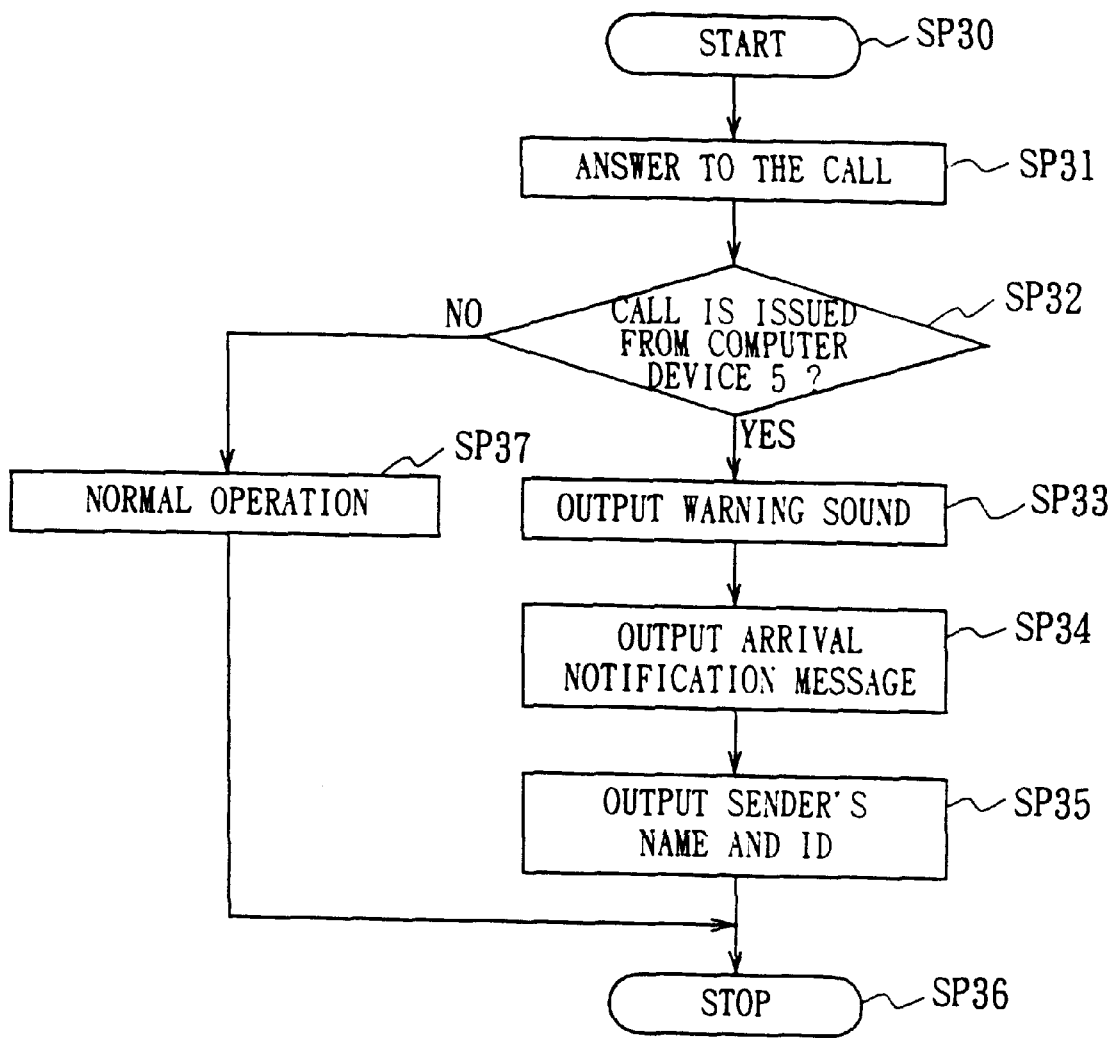
FIG. 8 is a flowchart explaining the communication processing procedure in the case where the portable information terminal device is the portable telephone.

Furthermore, the communication processing procedure in the case where the portable information terminal device is the portable telephone 10 (FIG. 1) will be described below. As shown in FIG. 8, the portable telephone 10 starts the procedure at step SP30. At step SP31, the portable telephone 10 receives the call issued from the other party side. Thereby, the communication circuit is established between the portable telephone 10 and the other party side. Note that, the portable telephone 10 is in a waiting state till the call is issued from the other party side.

Then, at step SP32, the procedure differs depending on whether or not the call is issued from the computer 5. If the call is issued from the computer 5, at step SP33, the portable telephone 10 informs the user that the data transmitted from the computer 5 has been received by outputting the warning sound from the speaker 30 (FIG. 4). As described above, the warning sound is the speech data added to the head of the message data which is transmitted by the computer 5. Accordingly, the portable telephone 10 can warn the user by outputting the speech data as it is and can inform the user the arrival of message to inform the arrival of electronic mail.

Sequentially, at step SP34, the portable telephone 10 outputs the message data transmitted from the computer 5 from the speaker 30 by speech signal. Then, at step SP35, the portable telephone 10 outputs the name and ID number of the sender of electronic mail. Thus, when the arrival of electronic mail is informed, the procedure is terminated at step SP36.

On the other hand, if the call is not issued from the computer 5, that is, if the call is issued from the other telephone device, the process proceeds to step SP37, and the portable telephone 10 conducts the normal communication operation and then terminates the procedure (step SP36).

In the electronic mail system (FIG. 1), the computer 5 detects the arrival of electronic mail, and transmits the message data for informing the arrival to the portable computer 9 and the portable telephone 10 when the arrival is detected. Thereby, the arrival of electronic mail can be informed to the user via the portable computer 9 and the portable telephone 10 being carried by the user even when the user is away from the computer 5.

Further, since it is so arranged that the arrival of electronic mail is notified to the portable computer 9 and the portable telephone 10 from the computer 5, it becomes unnecessary for the portable computer 9 or the portable telephone 10 to access to the computer 5 in order to find whether or not the electronic mail is arrived. Thus, a drop in operating time of the portable computer 9 or the portable telephone 10 can be prevented by avoiding the battery consumption of the portable computer 9 or the portable telephone 10 due to wasteful repetition of accesses.

According to the aforementioned construction, since each of computers, 5 being terminal devices connected each other through such as the LAN 2, is connected with the modem 6 and a program for executing a predetermined communication processing procedure and setup information necessary for executing the program have been stored on the hard disk drive 14 in advance, the computer 5 can transmit an arrival notification message to the portable computer 9 or the portable telephone 10 being a radio information terminal devices through a predetermined communication circuit when the electronic mail has arrived, and thereby the access to confirm the arrival of electronic mail to the computer 5 from the portable computer 9 or the portable telephone 10 is unnecessary, thus the battery consumption of the portable computer 9 or the portable telephone 10 due to the wasteful repetition of accesses can be prevented.

The electronic mail system 1 capable of informing the arrival of electronic mail during the user's absence and preventing a drop in operating time of the portable computer 9 or the portable telephone 10 can be realized.

(2) Second Embodiment

Figure 9:
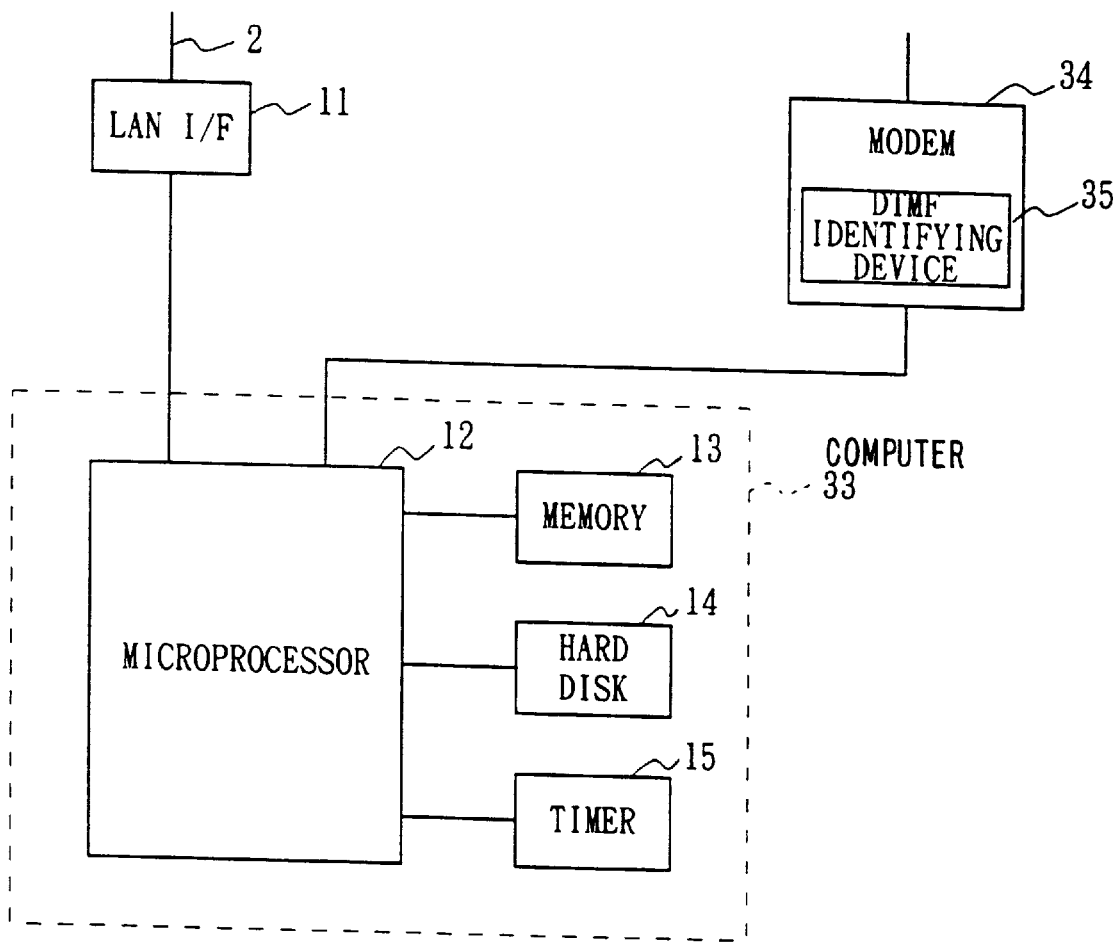
FIG. 9 is a block diagram showing the construction of a computer device according to the second embodiment.

In FIG. 9, in which the corresponding parts of FIG. 2 are designated the same reference numerals, numeral 33 shows a computer as a terminal device which is connected to the electronic mail system having the same construction as the electronic mail system 1 (FIG. 1) and is the same construction as the computer 5 of FIG. 2. Further, numeral 34 shows a modem connected to the computer 33 and is provided for connecting a communication circuit between the computer 33, and the portable computer 9 or the portable telephone 10 being a portable information terminal device.

Here, a dual tone multi-frequency (DTMF) identifying device 35 is provided in the modem 34. The DTMF identifying device 35 receives a DTMF signal which is transmitted from the portable computer 9 and the portable telephone 10 by operating the key 23 or 31 and converts the DTMF signal into a corresponding command signal to supply this to the microprocessor 12 (FIG. 2).

In the DTMF identifying device 35 in the modem 34, corresponding information between the DTMF signal which is transmitted from the portable computer 9 or the portable telephone 10 and the command signal corresponding to the DTMF signal has been set in advance by combining a plurality of numeric keys. The DTMF identifying device 35, referring to the corresponding information, converts the DTMF signal which is transmitted from the portable computer 9 or the portable telephone into the corresponding command signal in order to supply this to the microprocessor 12.

Further, a predetermined secret number is registered in the DTMF identifying device 35, and other DTMF signals are ignored unless this secret number is inputted. Thus, the DTMF identifying device 35 performs a security check so that the computer 33 is not controlled accidentally by a third party other than the users.

Furthermore, the response message produced by the user in advance is recorded on the hard disk drive 14. In the case where a command responding to the DTMF signal transmitted from the portable computer 9 or the portable telephone 10 instructs to transmit the response message to a specified sender, the computer 33 reads the response message from the hard disk drive 14 to transmit it.

According to the aforementioned construction, the computer 33 is remote-controlled according to the DTMF signal which is transmitted from the portable computer 9 or the portable telephone 10 by controlling the communication in accordance with a procedure described below. Firstly, referring to FIG. 10, a communication processing procedure by the portable computer 9 or the portable telephone 10 will be described.

Figure 10:
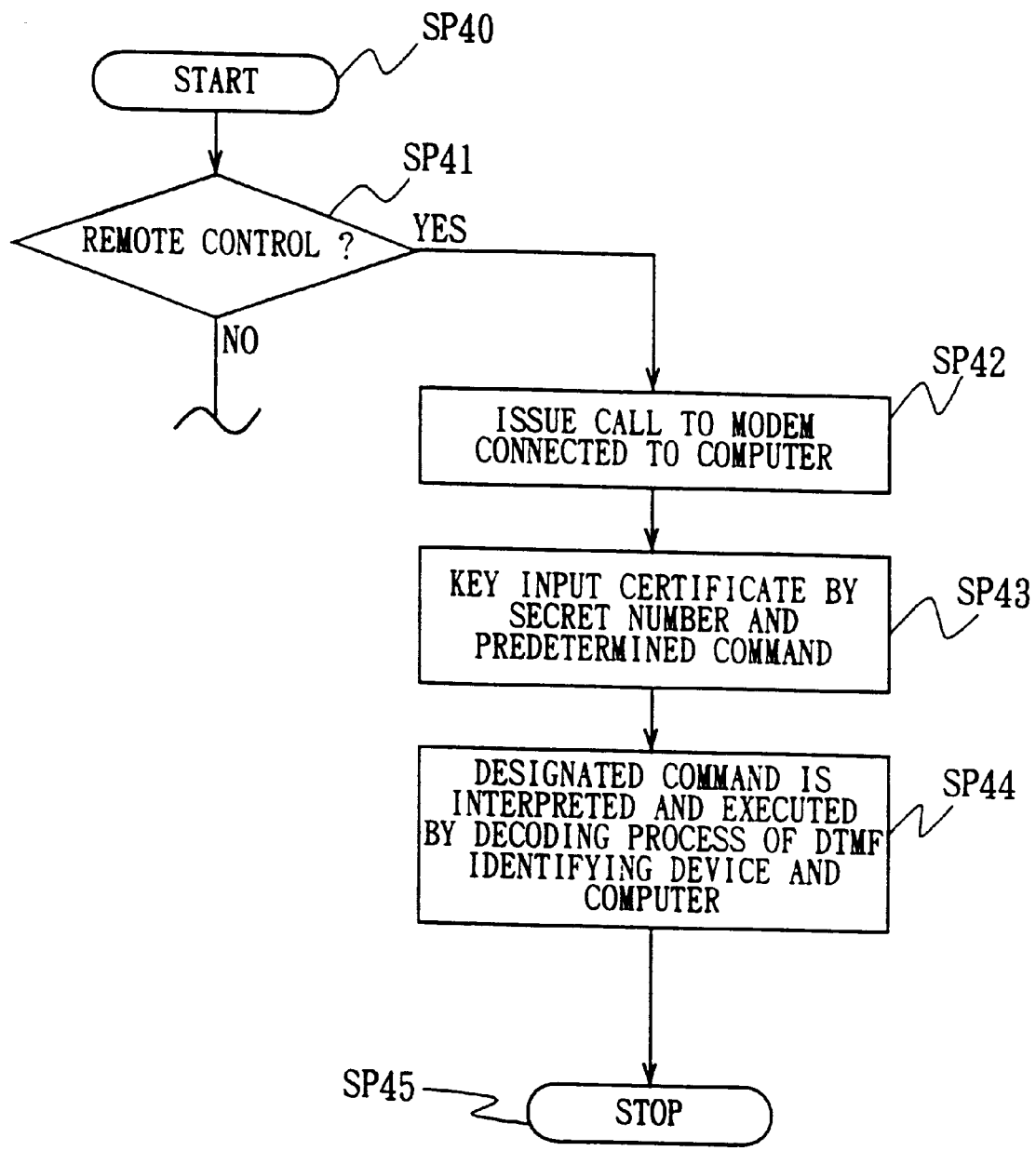
FIG. 10 is a flowchart explaining the communication processing procedure of a portable information terminal device according to the second embodiment.

As shown in FIG. 10, the portable computer 9 or the portable telephone 10 starts the procedure at step SP40. Then, the portable computer 9 or the portable telephone 10 branches off the succeeding procedure depending on whether or not the remote control is performed. If the remote control is not performed, the process jumps to step SP20 or step SP30 (FIG. 7 or FIG. 8). In the case of remote-controlling, the process proceeds to step SP42.

At step SP42, the portable computer 9 or the portable telephone 10 make a call to the modem 34 connected to the computer 33. More precisely, the user inputs a predetermined telephone number by operating the key 23 or 31 (FIG. 3 or 4) to make a call. When a communication circuit is established with the modem 34 by the issued call, at step SP43, the user inputs a predetermined secret number and a combination of numbers corresponding to a desired command by operating the key 23 or 31 of the portable computer 9 or the portable telephone 10.

At step SP44, the portable computer 9 or the portable telephone 10 transmits a DTMF signal corresponding to the inputted secret number and command to the modem 34 through the communication circuit. The computer 33, upon receiving the DTMF signal, interprets and converts the DTMF signal into the corresponding command signal and supplies it the microprocessor 12. The command is executed based on the command signal. This will be described in detail later.

Thus, when the desired command is executed, the portable computer 9 or the portable telephone 10 terminates the procedure at step SP45.

Next, a communication processing procedure at the computer 33 side according to the command signal which is transmitted from the portable computer 9 or the portable telephone 10 will be described.

Figure 11:
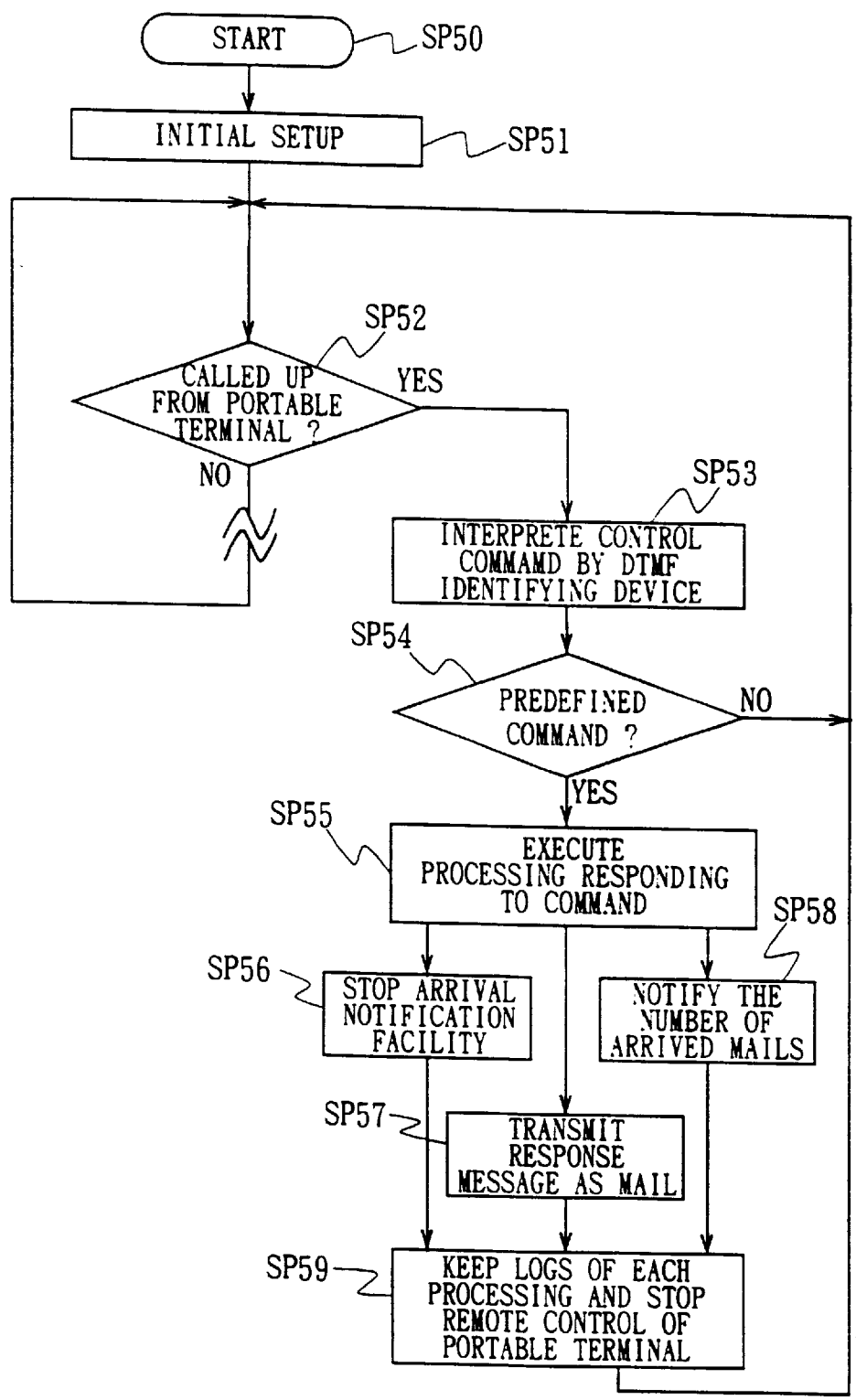
FIG. 11 is a flowchart explaining the communication processing procedure of a computer device according to the second embodiment.

As shown in FIG. 11, the computer 33 starts the procedure at step SP50. Then, at step SP51, the computer 33 performs an initial setting. More precisely, the same setting as the setting described at step SP2 in FIG. 5 will be performed. After completing the initial setting, the computer 33 becomes in a waiting state (not shown). More specifically, in the case where the electronic mail has arrived or the call is received, the process proceeds to the following step.

In the case where any access as described above has been received, at step SP52, the computer 33 judges whether the access is caused by the electronic mail arrived through the LAN 2 (FIG. 9) or the call issued from the portable computer 9 or the portable telephone 10. In the case of the arrival of electronic mail, after executing the corresponding communication processing procedure (SP3 to SP19 of FIG. 5), the computer 33 returns to the access waiting state. On the other hand, in the case of the call issued from the portable computer 9 or the portable telephone 10, at the next step SP53, the computer 5 converts the DTMF signal received by the DTMF identifying device 35 into the corresponding command signal to supply it to the microprocessor 12.

More specifically, firstly, the DTMF identifying device 35 judges whether or not the predetermined secret number has received. When the reception of the secret number is confirmed, the DTMF identifying device 35 converts DTMF signals to be received thereafter into corresponding command signals. On the other hand, in the case where the reception of the secret number is not confirmed, the computer 33 returns to the access waiting state again. At this point, the DTMF identifying device 34 converts the received DTMF signal into the corresponding command signal by referring to the corresponding information registered in advance. Moreover, as a reference result of the corresponding information, if there is no corresponding command, the DTMF identifying device 35 returns to the access waiting state at step SP54.

Next, at step SP55, the microprocessor 12 executes the process corresponding to the converted command signal. If the command signal is a signal to stop the arrival notification facility, the microprocessor 12 conducts the process by changing the setup information at the step SP56. More precisely, as described above, in the setup information, an item to specify the sender of electronic mail to which the arrival is informed is provided, and by canceling the item, it can make that the computer 33 does not inform the arrival on all of arrived electronic mails. In this case, in the communication processing procedure, at the part for judging whether or not the arrived electronic mail is from the specific sender, it branches off always in the direction of "NO" (SP7 of FIG. 5).

Further, in the case where the command signal is a signal to transmit a response message, at step SP57, the microprocessor 12 reads out the response message from the hard disk drive 14 to transmit it. More specifically, in the case where the sender of electronic mail requires an urgent reply, he repeats transmitting electronic mail over and over again if no reply is received to the transmitted electronic mail. In the case where the sender of the electronic mail is the specific sender registered in the setup information, the arrival is informed each time to the portable computer 9 or the portable telephone 10.

Therefore, the response message is transmitted to the sender of electronic mail by remote-controlling the computer 33 in accordance with the DTMF signal which is transmitted from the portable computer 9 or the portable telephone 10, thereby the repeated transmissions of electronic mail can be avoided. In this case, if the user's address is shown in the response message, it can cope with the case of requiring an urgent reply.

Moreover, in the case where the command signal is a signal to inform the sum of arrived electronic mails, at the step SP58, the microprocessor 12 reads out the sum of arrived electronic mails from the hard disk drive 14 to transmits it to the portable computer 9 or the portable telephone 10.

After performing the processing corresponding to the command signal, the computer 33 stores the communication record informing that the processing have been performed in the hard disk drive 14 and terminates the procedure at the step SP59 and returns to the access waiting state.

In this way, since the computer 33 is connected to the modem 34 equipped with the DTMF identifying device 35, the DTMF signal combined with the specified keys to be transmitted from the portable computer 9 or the portable telephone 10 can be converted into the corresponding command signal and can be remote-controlled by the portable computer 9 or the portable telephone 10. Thereby, in the case where there is no urgent business, arrival notification facility can be stopped or the response message can be transmitted to the sender of electronic mail who has an urgent business. Thus, the consumption of battery power of the portable computer 9 or the portable telephone due to unnecessary accesses by repeating to inform the arrival can be prevented.

According to the aforementioned construction, the modem 34 equipped with the DTMF identifying device 35 which is capable of converting the DTMF signal to be transmitted from the portable computer 9 or the portable telephone 10 into the corresponding command signal is connected to the computer 33, so that the computer 5 can be remote-controlled by the portable computer 9 or the portable telephone 10. Thereby, the electronic mail system capable of avoiding the wasteful consumption of battery power of the portable computer 9 or the portable telephone 10 can be realized.

(3) Other Embodiments

Note that, while in the aforementioned first and second embodiments, the present invention is applied to the computer 5 or 33 being each terminal device connected over a network formed by the LAN 2, however, the present invention is not limited thereto and the present invention can be applied to the computer connected over a network formed by the WAN. That is, if the network is a network to receive and transmit electronic mails between computers, it can be applied to the network of any form.

Further, while in the aforementioned second embodiment, the DTMF identifying device 35 is provided in the modem 34, however, the present invention is not limited thereto and the DTMF identifying device is provided in the computer device and the DTMF signal which is supplied to the computer device from the modem can be supplied to the microprocessor after being converted into the specified command signal by the DTMF identifying device, and the same effect as those of the embodiment can be obtained in this case.

Furthermore, while in the aforementioned first embodiment, the arrival of electronic mail is informed by using the portable computer 9 or the portable telephone 10, however, the present invention is not only limited thereto and portable information terminal devices having other forms, which can display a short message, can be used only for informing the arrival of electronic mail.

According to the present invention as described above, the computer device connected to the computer network to receive the electronic mail services, comprises a first communication means for receiving and transmitting the electronic mail from/to the other computer devices connected to the computer network and detecting the arrival of electronic mails, a second communication means, which is connected to the radio communication net through the predetermined communication circuit, for communicating with the portable information terminal devices through the predetermined communication circuit and the radio communication net, a storage means in which identification information of the portable information terminal device is stored, and a communication control means for informing the arrival of electronic mail to the portable information terminal device through the predetermined communication circuit and the radio communication net established by the second communication means based on the identification information when the arrival of electronic mail is detected. And the arrival of electronic mail is detected and then the arrival is informed to the portable information terminal device side from the computer device side, thereby the arrival of electronic mail can be informed to the user even if the user is away from the computer device side and the access to the computer device side from the portable information terminal device side becomes unnecessary and wasteful consumption of battery of the portable information terminal device can be avoided. Thus, an electronic mail system, a computer device and an arrival notification method capable of confirming the arrival of electronic mails regardless where the user is and avoiding a drop in operating time of the portable information terminal device due to the wasteful repetition of accesses can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A computer device for use in an electronic mail system including a computer network to provide an electronic mail service and a plurality of said computer devices connected to said computer network to receive said electronic mail service, said computer device comprising:
   first communication means for receiving and transmitting electronic mail from/to another of said plurality of computer devices connected to said computer network;
   second communication means connected to a radio communication station and radio communication net through a telephone line for communicating with a portable information terminal device through said radio communication station and radio communication net via said telephone line;
   storage means in which sender identification information of at least one predetermined sender and identification information of said portable information terminal device are stored; and
   communication control means for detecting an arrival of said electronic mail from said another of said plurality of computer devices connected to said computer network, for determining whether said electronic mail is transmitted from said at least one predetermined sender, when the arrival of said electronic mail is detected, by comparing identification information detected at a predetermined position in said electronic mail with the sender identification information stored in said storage means, and for controlling, when it is determined that said received electronic mail is from said at least one predetermined sender, said second communication means to communicate the arrival of said electronic mail to said portable information terminal device, to which said electronic mail is addressed, through said radio communication station and radio communication net via said telephone line based on said identification information,
   wherein if said second communication means fails on a first attempt to communicate the arrival of said electronic mail to said portable information terminal device, said second communication means attempts to connect to said portable terminal device repeatedly at predetermined intervals until the arrival of said electronic mail is successfully communicated or until a predetermined number of unsuccessful attempts is reached, and a record is compiled of successful transmissions and unsuccessful attempts along with corresponding times and sender identification information for viewing by a user, and
   wherein when said portable information terminal device is a portable telephone the arrival of said electronic mail is communicated to said user by a warning sound that differs from a calling sound of the portable telephone, said warning sound being a voice message comprising speech data.

2. The computer device for use in an electronic mail system according to claim 1, wherein
   said communication control is operative in a case where it is judged with reference to said identification information that said portable information terminal device includes a character display unit when the arrival of said electronic mail is detected for informing the arrival of said electronic mail to said portable information terminal device by literal information.

3. The computer device for use in an electronic mail system according to claim 2, wherein
   said communication control means includes means for informing the arrival of said electronic mail and and for transmitting said arrived electronic mail to said portable information terminal device.

4. The computer device for use in an electronic mail system according to claim 1, wherein
   said communication control means is operative in a case where it is judged with reference to said identification information that said portable information terminal device has an audio output unit when the arrival of said electronic mail is detected for informing the arrival of said electronic mail to said portable information terminal device by means of speech information.

5. The computer device for use in an electronic mail system according to claim 1, wherein:
   said second communication means includes means for informing the arrival of said electronic mail to said portable information terminal device and for detecting a control signal transmitted from said portable information terminal device; and
   said communication control means includes means for transmitting a specified response message by said first communication means to said another computer device which is an originating source of said electronic mail in response to said detected control signal.

6. A computer device connected to a computer network to provide an electronic mail service and for receiving said electronic mail service from said computer network, said computer device comprising:

first communication means for receiving and transmitting electronic mail from/to another computer device connected to said computer network;

second communication means connected to a radio communication station and radio communication net through a telephone line for communicating with a portable information terminal device through said radio communication station and radio communication net via said telephone line;

storage means in which sender identification information of at least one predetermined sender and identification information of said portable information terminal device are stored; and communication control means for detecting an arrival of said electronic mail from one of a plurality of computer devices connected to said computer network, for determining whether said electronic mail is transmitted from said at least one predetermined sender, when the arrival of said electronic mail is detected, by comparing identification information detected at a predetermined position in said electronic mail with the sender identification information stored in said storage means, and for controlling, when it is determined that said received electronic mail is from said at least one predetermined sender, said second communication means to communicate the arrival of said electronic mail to said portable information terminal device through said radio communication station and radio communication net via said telephone line based on said identification information, wherein if said second communication means fails on a first attempt to communicate the arrival of said electronic mail to said portable information terminal device, said second communication means attempts to connect to said portable terminal device repeatedly at predetermined intervals until the arrival of said electronic mail is successfully communicated or until a predetermined number of unsuccessful attempts is reached, and a record is compiled of successful transmissions and unsuccessful attempts along with corresponding times and sender identification information for viewing by a user, and wherein when said portable information terminal device is a portable telephone the arrival of said electronic mail is communicated to said user by a warning sound that differs from a calling sound of the portable telephone, said warning sound being a voice message comprising speech data.

7. The computer device according to claim 6, wherein said communication control means is operative in a case where it is judged with reference to said identification information that said portable information terminal device has a character display unit when the arrival of said electronic mail is detected for informing the arrival of said electronic mail to said portable information terminal device by literal information.

8. The computer device according to claim 7, wherein said communication control means includes means for informing the arrival of said electronic mail and for transmitting said arrived electronic mail to said portable information terminal device.

9. The computer device according to claim 6, wherein said communication control means is operative in a case where it is judged with reference to said identification information that said portable information terminal device has an audio output unit when the arrival of said electronic mail is detected for informing the arrival of said electronic mail to said portable information terminal device by means of speech information.

10. The computer device according to claim 6, wherein:

said second communication means includes means for informing the arrival of said electronic mail to said portable information terminal device and for detecting a control signal transmitted from said portable information terminal device; and said communication control means includes means for transmitting a specified response message by said first communication means to said another computer device which is an originating source of said electronic mail in response to said detected control signal.

11. An arrival notification method for a computer device operating an electronic mail system to notify a personal information terminal device through a radio communication station and radio communication net connected to said computer device via a telephone line when electronic mail from a predetermined sender arrives at said computer device, comprising the steps of:

detecting an arrival of electronic mail at said computer device which is transmitted from another computer device connected to a computer network to provide an electronic mail service;

determining whether said electronic mail is transmitted from said predetermined sender, when the arrival of said electronic mail from said another computer device is detected, by comparing identification information detected at a predetermined position in said electronic mail with sender identification information of said predetermined sender stored in a storage means of said computer device;

when it is determined that said electronic mail is from said predetermined sender, connecting said computer device with said portable information terminal device through said radio communication station and radio communication net via said telephone line using recorded identification information of said portable information terminal device, and communicating the arrival of said electronic mail to said portable information terminal device through said radio communication station and radio communication net via said telephone line;

attempting, if said second communication means fails on a first attempt to communicate the arrival of said electronic mail to said portable information terminal device, to connect to said portable terminal device repeatedly at predetermined intervals until the arrival of said electronic mail is successfully communicated or until a predetermined number of unsuccessful attempts is reached;

compiling a record of successful transmissions and unsuccessful attempts along with corresponding times and sender identification information for viewing by a user; and when said portable information terminal device is a portable telephone, communicating to a user the arrival of said electronic mail by emitting a warning sound that differs from a calling sound of the portable telephone, said warning sound being a voice message comprising speech data.

12. The arrival notification method according to claim 11, comprising the further steps of:

referring to said identification information when the arrival of said electronic mail is detected; and informing the arrival of said electronic mail to said portable information terminal device by means of literal information when it is judged that said portable information terminal device has a character display unit.

13. The arrival notification method according to claim 12, comprising the further steps of:

informing the arrival of said electronic mail; and transmitting said arrived electronic mail to said portable information terminal device.

14. The arrival notification method according to claim 11, comprising the further steps of:

referring to said identification information when the arrival of said electronic mail is detected; and informing the arrival of said electronic mail to said portable information terminal device by means of speech information when it is judged that said portable information terminal device has an audio output unit.

* * * * *